United States Patent [19]

Shizuya

[11] Patent Number: 5,760,577
[45] Date of Patent: Jun. 2, 1998

[54] LC RESONANCE CIRCUIT DISPLACEMENT SENSOR

[75] Inventor: Yoshihiro Shizuya, Suzaka, Japan

[73] Assignee: Techno Excel Kabushiki Kaisha, Nagano-ken, Japan

[21] Appl. No.: 634,928

[22] Filed: Apr. 19, 1996

[30] Foreign Application Priority Data

Apr. 20, 1995 [JP] Japan ................. 7-095270

[51] Int. Cl.⁶ ................. G01B 7/14; G01P 15/11; G01L 7/08; G01G 3/00
[52] U.S. Cl. ................. 324/207.16; 73/514.31; 73/514.38; 73/722; 177/210 EM; 324/207.22; 324/207.26; 324/234
[58] Field of Search ................. 324/207.16, 207.24, 324/207.26, 207.17, 207.18, 207.22; 73/313, 314, 514.31, 514.38, 722, 728; 177/210 EM; 367/178; 340/686, 690

[56] References Cited

U.S. PATENT DOCUMENTS

| | | | |
|---|---|---|---|
| 3,201,774 | 8/1965 | Uemura | 324/327 X |
| 3,255,405 | 6/1966 | French | 324/234 |
| 3,373,374 | 3/1968 | Marosi | 324/234 X |
| 3,381,217 | 4/1968 | Williamson et al. | 324/236 |
| 3,602,806 | 8/1971 | Czekajewski | 324/234 |
| 3,735,244 | 5/1973 | Gumtau et al. | 324/207.16 X |
| 3,896,371 | 7/1975 | Hametta | 324/327 |
| 4,568,937 | 2/1986 | Clark | 324/236 X |
| 4,835,471 | 5/1989 | Kutilin | 324/236 |
| 4,896,110 | 1/1990 | Shimizu et al. | 324/207.18 |
| 4,983,914 | 1/1991 | Baranski | 324/207.16 |
| 5,012,206 | 4/1991 | Tigges | 324/236 X |
| 5,313,161 | 5/1994 | Miyazawa et al. | 324/207.16 |

FOREIGN PATENT DOCUMENTS

3347052 7/1985 Germany ................. 324/207.16

OTHER PUBLICATIONS

Kaplan et al; Inductive impedance transducer for recording displacements of ferromagnetic and nonferromagnetic conductive objects, Rev. Sci. Instrum., vol. 49, No. 11, Nov. 1978, pp. 1583-1587.

*Primary Examiner*—Gerard R. Strecker
*Attorney, Agent, or Firm*—Birch, Stewart, Kolasch & Birch, LLP

[57] ABSTRACT

The present invention is a displacement sensor, which is capable of keeping high sensing resolution even if the amount of displacement of the core and the amount of changing the inductance are small. In the displacement sensor of the present invention, a displacing body is capable of displacing according to external force. An LC resonance circuit includes a magnetic coil and a core made of a magnetizable material, which is capable of moving close to and away from the magnetic coil according to the displacement of the displacing body. An oscillator inputs continuous signals having prescribed frequency to the LC resonance circuit. A detecting circuit detects the amount of the displacement of the displacing body on the basis of amplitude of the continuous signals from the LC resonance circuit.

6 Claims, 6 Drawing Sheets

| DISPLACEMENT OF DIAPHRAGM (GAS PRESSURE) | SMALL (LOW) ⟷ GREAT (HIGH) |
|---|---|
| INDUCTANCE (L) | SMALL ⟷ GREAT |
| RESONANCE FREQUENCY | HIGH ⟷ LOW |
| VOLTAGE ($V_0$) | LOW ⟷ HIGH |

FIG.5
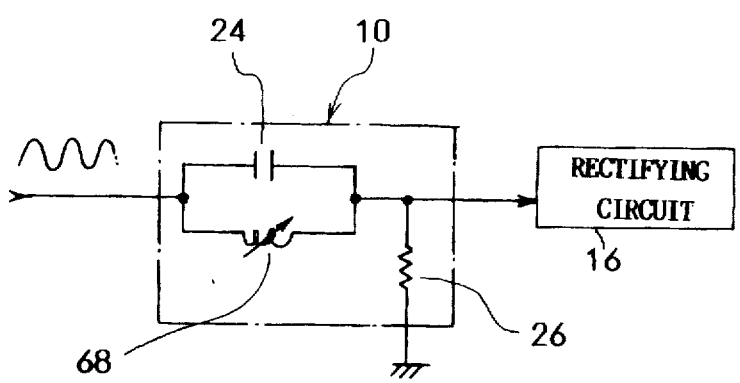
FIG.6
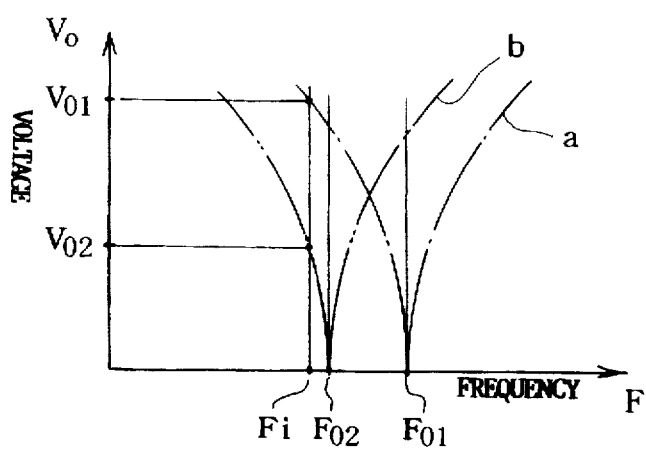
FIG.7
| DISPLACEMENT OF DIAPHRAGM (GAS PRESSURE) | SMALL ⟷ GREAT (LOW) (HIGH) |
|---|---|
| INDUCTANCE (L) | SMALL ⟷ GREAT |
| RESONANCE FREQUENCY | HIGH ⟷ LOW |
| VOLTAGE (Vo) | HIGH ⟷ LOW |

1

LC RESONANCE CIRCUIT DISPLACEMENT SENSOR

BACKGROUND OF THE INVENTION

The present invention relates to a displacement sensor.

A conventional displacement sensor will be explained with reference to FIGS. 8 and 9. Note that, the conventional sensor is a sensor for detecting pressure on the basis of amount of displacement of a displacing body. The sensor 50 can be employed, for example, as a water level sensor of an electric washer, a dish washer, etc.

As shown in FIG. 8, the pressure sensor 50 has: a diaphragm 56 (a displacing body), whose edge is pinched by a base proper 52 and a lower casing 54; a magnetic coil 58 provided in the base proper 52; a core 60 made of a magnetizable material, e.g., ferrite; a spring 61 always biasing the diaphragm 56 toward an initial position; an inlet 64 formed in the lower casing 54; and an LC oscillating circuit 62 (see FIG. 9). The inlet 64 is connected with a hose (not shown) so as to introduce a fluid member (not shown), e.g., gas, water, into the sensor 50. The core 60 is fixed on a pressure receiving plate 66, which is fixed on a non-pressurized side face (an upper side face) of the diaphragm 56. With this structure, the core 60 is capable of moving close to and away from the magnetic coil 58 according to the displacement of the diaphragm 56. The core 60 and the magnetic coil 58 constitute a so-called variable coil 68 of the LC oscillating circuit 62 (see FIG. 9). A capacitor 70 also constitutes the LC oscillating circuit 62, and its capacitance is fixed.

In the above described conventional sensor 50, when gas pressure, for example, is changed, the diaphragm 56 displaces according to the change of the gas pressure, so that the core 60 is moved close to or away from the magnetic coil 58. With the movement of the core 60, inductance of the variable coil changes according to the amount of the displacement of the diaphragm 56. Then, frequency F of output signals (detected signals) of the LC oscillating circuit 62, which is based on the following Formula (1), also changes. The frequency F of the output signals is measured and calculated by a detecting circuit (not shown) so as to calculate the amount of displacement of the diaphragm 56 and the gas pressure.

$$F=1/(2\pi\sqrt{(LC)})\qquad\text{Formula (1)}$$

Note)
L: the inductance of the variable coil; and
C: the capacitance of the capacitor.

However, the conventional displacement sensor has following disadvantages.

In the displacement sensor, the displacement of the diaphragm and the core is converted into the change of the gas pressure. The displacement of the core and the change of the gas pressure can be detected on the basis of the change of the frequency of the detected signals of the LC oscillating circuit, which includes the magnetic coil, whose inductance is changed according to the displacement of the core. But the oscillating frequency of the detected signals of the LC oscillating circuit is in inverse proportion to square root of the inductance as shown by the Formula (1). Thus, the amount of the change of the frequency with respect to the amount of the displacement of the core is small, so that resolution of the sensor must be low.

Secondly, when the gas pressure is high and the amount of the displacement of the diaphragm is great, elastic force of the spring, which biases the diaphragm, is great, so displacement ratio of the diaphragm with respect to the change of the gas pressure must be limited. With this structure, the changing ratio of the inductance and the frequency must be lower, so that the resolution of the sensor must be lower.

SUMMARY OF THE INVENTION

An object of the present invention is to provide a displacement sensor, which is capable of keeping high sensing resolution even if the amount of displacement of the core and the amount of changing the inductance are small.

To achieve the object, the displacement sensor of the present invention comprises:

a displacing body being capable of displacing according to external force;

an LC resonance circuit including a magnetic coil, and a core being made of a magnetizable material and capable of moving close to and away from the magnetic coil according to the displacement of the displacing body;

an oscillator for inputting continuous signals having prescribed frequency to the LC resonance circuit; and a detecting circuit for detecting amount of displacement of the displacing body on the basis of amplitude of the continuous signals from the LC resonance circuit.

The displacement sensor of the present invention may further comprise a rectifying circuit for rectifying and smoothing the continuous signals from the LC resonance circuit, wherein the detecting circuit detects the amount of the displacement of the displacing body on the basis of DC voltage from the rectifying circuit.

In the displacement sensor, resonance frequency of the LC resonance circuit may be designed to change, with the movement of the core, in a range equal to or greater than the prescribed frequency.

In the displacement sensor, the external force may be fluid pressure, wherein the detecting circuit detects the fluid pressure on the basis of the amount of displacing of the displacing body.

In the displacement sensor, the displacing body may be a diaphragm capable of displacing according to the change of the fluid pressure, wherein the detecting circuit detects the fluid pressure on the basis of the amount of displacing of the diaphragm.

In the displacement sensor, the external force may be weight of an object member, wherein the detecting circuit detects the weight on the basis of the amount of displacing of the displacing body.

Further, the displacement sensor of the present invention may comprise:

an LC resonance circuit including a magnetic coil, and a core being made of a magnetizable material and capable of moving close to and away from said magnetic coil according to external force;

an oscillator for inputting continuous signals having prescribed frequency to said LC resonance circuit; and a detecting circuit for detecting amount of displacement of said core on the basis of amplitude of the continuous signals from said LC resonance circuit.

In the present invention, the amount of the change of the continuous signals, namely the amount of the change of the amplitude thereof with respect to the amount of the change of the inductance can be greater than that of the conventional displacement sensor, so that the amount of the displacement of the displacing body is readily detected without making the resolution of the sensor low.

By the the rectifying circuit for rectifying and smoothing the continuous signals and by the detecting circuit detecting the amount of the displacement of the displacing body on the basis of DC voltage from said rectifying circuit, structure of the detecting circuit can be simpler than that of the detecting circuit of the conventional sensor, which measures frequency or amplitude of AC signals.

Even if, in the sensor, e.g., a pressure sensor, having the diaphragm as the displacing body, the diaphragm is always biased toward an initial position by a spring, which limits the displacement ratio of the diaphragm when the pressure is high, by designing the resonance frequency of the LC resonance circuit to change, with the movement of the core, in the range equal to or greater than the prescribed frequency, the greater the amount of displacement of the displacing body is made, the greater the degree of increasing the output voltage of the resonance circuit is made. Therefore, linearity of the detection or sensing of the sensor can be improved.

In the case of displacing the displacing body by pressure, weight or acceleration as the external force, the pressure, the weight or the acceleration can be detected as magnitude of the external force without making the resolution low.

By employing the LC resonance circuit including the magnetic coil and a core capable of moving close to and away from the magnetic coil according to external force; the oscillator for inputting the continuous signals having the prescribed frequency to the LC resonance circuit; and the detecting circuit for detecting the amount of displacement of the core on the basis of amplitude of the continuous signals, the sensor for detecting the amount of the displacement of the core, in which the core is directly displaced by the external force, can be realized.

BRIEF DESCRIPTION OF THE DRAWINGS

Embodiments of the present invention will now be described by way of examples and with reference to the accompanying drawings, in which:

FIG. 5 is a circuit diagram of the resonance circuit of a Second Embodiment;

FIG. 6 is a graph showing interrelationship between frequency of an oscillator and output voltage of a rectifying circuit shown in FIG. 5;

FIG. 7 is a table showing interrelationship among the gas pressure, inductance, resonance frequency and voltage Vo of the sensor shown in FIG. 5;

DETAILED DESCRIPTION OF THE PREFERRED EMBODIMENTS

Preferred embodiments of the present invention will now be described in detail with reference to the accompanying drawings.

(First Embodiment)

In the First Embodiment, a pressure sensor for sensing fluid pressure will be explained as an example of the displacement sensor of the present invention. Note that, the pressure sensor is capable of sensing not only gas pressure but also liquid pressure.

The mechanical structure of the pressure sensor of the present embodiment is the same as that of the conventional pressure sensor 50, which has been explained in BACKGROUND OF THE INVENTION, so the pressure sensor of the present embodiment has: the diaphragm 56, which displaces according to the change of the gas pressure; the magnetic coil 58; and the core 60 made of the magnetizable material, which is capable of moving close to and away from the magnetic coil 58 according to the displacement of the diaphragm 56.

Figure 1:
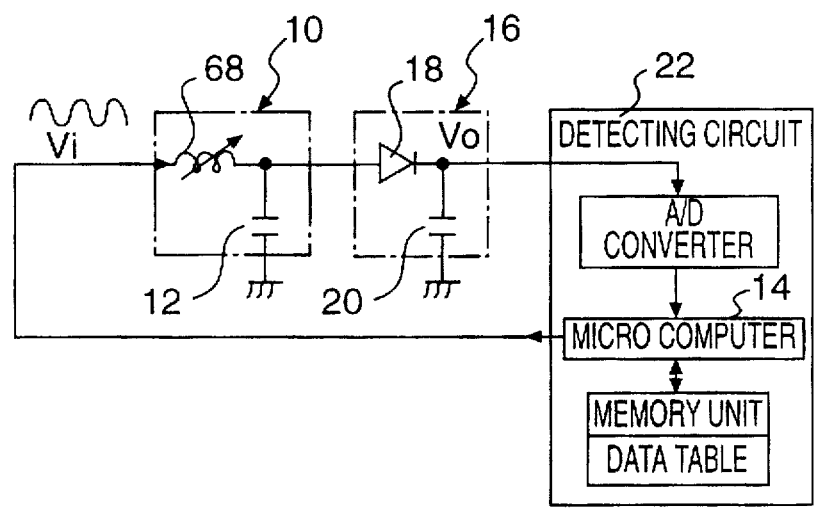
FIG. 1 is a block diagram of a First Embodiment of the displacement sensor of the present invention.

Electric circuits of a sensing unit for detecting or sensing the change of the gas pressure, which works with the diaphragm 56, on the basis of the change of the inductance of the variable coil 68, which is constituted by the magnetic coil 58 and the core 60, will be explained with reference to FIG. 1.

An LC resonance circuit 10 includes the variable coil 68 and a capacitor 12. The LC resonance circuit 10 is a serial resonance circuit as an example, and the capacitor 12 is connected to the ground.

An oscillator 14 is connected to the variable coil 68 of the LC resonance circuit 10 so as to input continuous signals having prescribed frequency thereto. The continuous signals may be sine waves, pulses, etc. For example, pulses may be outputted from a clock unit of a microcomputer, which is included in a detecting circuit 22, or from a common output port of the microcomputer on the basis of a program. The oscillator 14 may always output the continuous signals, or it may output the continuous signals while only the gas pressure is detected so as to reduce electricity consumption.

A rectifying circuit 16 includes a diode 18 and a capacitor 20 for smoothing waveform. An anode terminal of the diode 18 is connected to a mid point between the variable coil 68 and the capacitor 12 of the LC resonance circuit 10.

The detecting circuit 22 detects the amount of the displacement of the diaphragm 56 and the gas pressure working to the diaphragm 56 on the basis of DC voltage between both ends of the smoothing capacitor 20 as detected signals. Concretely, the detecting circuit 22 has: an A/D converter for converting the voltage between the both ends of the capacitor 20, which is analogue value, into digital value; and the microcomputer, which stores a table of parameters for converting the digital value into the amount of the displacement of the diaphragm 56, and a table of parameters for converting the amount of the displacement of the diaphragm 56 into gas pressure output. Note that, a memory unit for storing the tables may be independent from the microcomputer and connected thereto. And the memory may be provided in the microcomputer. The microcomputer may control the oscillator 14 to output the continuous signals.

Next, action of the gas pressure sensor will be explained.

Firstly, the continuous signals, e.g., the sine waves, which have fixed frequency Fi and fixed amplitude Vi, are outputted from the oscillator 14 and inputted to the LC resonance circuit 10. The output voltage Vo of the rectifying circuit 16 is calculated on the basis of the following Formula (2).

$$Vo = Vi/|1 - \omega^2 LC| \quad (\omega = 2\pi F) \qquad \text{Formula (2)}$$

Note)
F: the frequency of the continuous signals inputted to the resonance circuit;
L: the inductance of the variable coil; and
C: the capacitance of the capacitor.

Note that, the Formula (2) is premised that the circuit parts are desired ones, namely the coil and the capacitor have no serial resistance elements, and no voltage drop, occurs in the diode.

Figure 2:
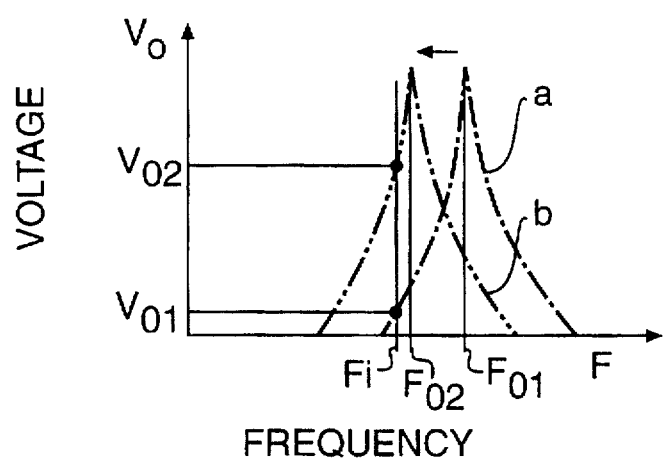
FIG. 2 is a graph showing interrelationship between frequency of an oscillator and output voltage of a rectifying circuit shown in FIG. 1.

Interrelationship between the frequency F (a horizontal axis) and the voltage Vo (a vertical axis) based on the Formula (2) is shown in FIG. 2. The resonance frequency Fo (see Formula (1) in BACKGROUND OF THE INVENTION) is changed according to the change of the inductance L of the coil 68, so that the graph is shifted. If the inductance L is gradually made greater, the resonance frequency Fo is gradually smaller, so that the graph is shifted leftward in FIG. 2.

Note that, if initial gas pressure is, for example, zero (0) and the diaphragm 56 is located at the initial position, the graph is shown by a one-dot chain line "a". At that time, the resonance frequency of the LC resonance circuit 10 is Fo1. If the frequency of the continuous signals is Fi, the voltage Vo is Vo1.

Figures 3, 4:
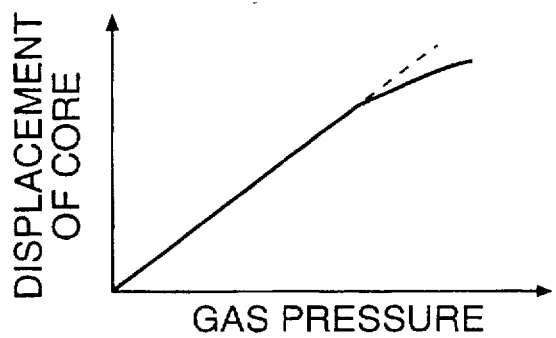
FIG. 3 is a graph showing interrelationship between amount of displacement of a core and gas pressure.
FIG. 4 is a table showing interrelationship among the gas pressure, inductance, resonance frequency and voltage Vo of the sensor shown in FIG. 1.
Figure 8:
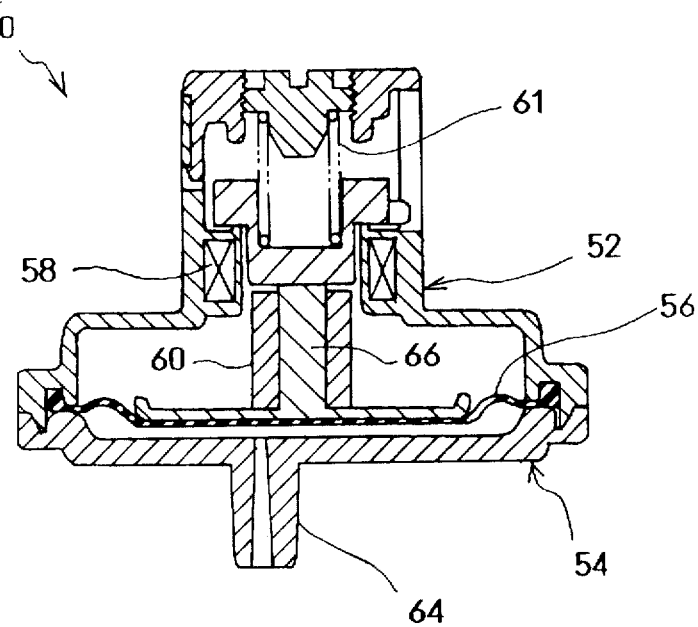
FIG. 8 is a front sectional view of the conventional pressure sensor showing an inner structure.
Figure 9:
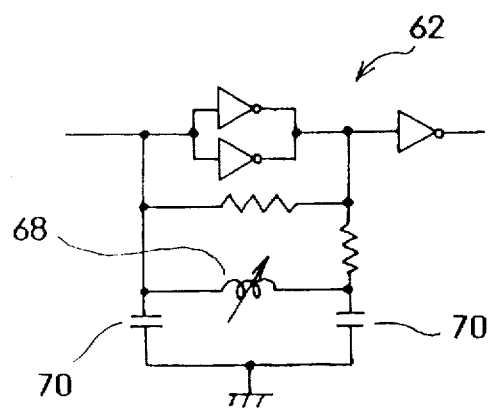
FIG. 9 is a circuit diagram of the LC oscillator of the conventional pressure sensor.

In this state, when the gas pressure is raised, the diaphragm 56 is displaced upward in FIG. 8, so that the core 60 moves close to the magnetic coil 58. By moving the core 60 close to the magnetic coil 58, the inductance of the variable coil 68 gradually becomes greater; the resonance frequency Fo of the LC resonance circuit 10 gradually becomes lower, so that the graph is shifted leftward from the location of the graph "a". In the case of shifting the graph "a" to a graph "b" (a graph shown by a two-dot chain line), the resonance frequency becomes Fo2. If the frequency of the continuous signals is Fi, the voltage Vo rises from Vo1 to Vo2. Interrelationship among the gas pressure, the inductance L, the resonance frequency Fo and the voltage Vo of this case is shown in FIG. 4.

With above described action, the gas pressure can be detected by detecting the DC voltage Vo outputted from the rectifying circuit 16 with the detecting circuit 22.

Note that, in the case that the voltage level outputted from the LC resonance circuit 10 is too high due to resonance action, the voltage level can be adjusted by connecting a resistance with the LC resonance circuit 10 in series.

As described in BACKGROUND OF THE INVENTION, the greater the amount of the displacement of the diaphragm 56 becomes, the greater the biasing force of the spring 61 working to the diaphragm 56 becomes. In the conventional sensor, if the gas pressure is very great, the displacement ratio of the diaphragm 56 (the core 60) is quite small, so linearity of detecting the gas pressure is low. But, in the pressure sensor of the present embodiment, the degree of increasing the changing ratio of the voltage Vo is greater in an area in which the resonance frequency F is equal to or lower than Fo1 or Fo2 (see FIG. 2). Thus, the characteristic curve shown in FIG. 3 can be improved by the characteristic curves shown in FIG. 2. Namely, if the gas pressure is high and the amount of the displacement of the diaphragm 56 is great, the linearity of detecting the gas pressure can be improved.

By employing the LC resonance circuit 10, the amount of changing the voltage Vo with respect to the amount of changing the inductance L can be greater, the resolution of detecting the gas pressure can be improved. The voltage Vo outputted from the rectifying circuit 16 can be equal to or greater than the input voltage Vi, so process in following stages can be easier.

(Second Embodiment)

In a Second Embodiment too, a pressure sensor is explained as the displacement sensor.

Structure of the sensor of the present embodiment is almost the same as that of the First Embodiment. But, in the Second Embodiment, the LC resonance circuit 10 is a parallel resonance circuit, so the parameter tables for detecting the gas pressure in the microcomputer of the detecting circuit 22 are different from those of the First Embodiment.

In the LC resonance circuit 10, the capacitor 24 is connected to the variable coil 68 in parallel. And the LC resonance circuit is connected in series to the rectifying circuit 16; a resistance 26 is connected to a mid point of the LC resonance circuit 10 and the rectifying circuit 16 (see FIG. 5).

Since the LC resonance circuit 10 is the parallel resonance circuit as shown in FIG. 5, interrelationship between the frequency F and the voltage Vo is shown as graph in FIG. 6. Namely, the resonance frequency Fo is changed according to the change of the inductance L of the variable coil 68, so that the graph is shifted sideward. If the inductance L is gradually increased, the resonance frequency Fo is gradually made lower, so the graph is shifted leftward in FIG. 6.

Note that, if the gas pressure is an initial value, e.g., zero (0) and the diaphragm 56 is located at the initial position, the graph is shown by a one-dot chain line "a". At that time, the resonance frequency of the LC resonance circuit 10 is Fo1. If the frequency is Fi, the voltage Vo is Vo1.

The action of the pressure sensor in a state of rising gas pressure will be explained.

When the gas pressure begins to rise, the diaphragm 56 begins to displace, so the core 60 is moved toward the magnetic coil 58. With this movement, the inductance L of the variable coil 68 gradually becomes greater; the resonance frequency of the LC resonance circuit 10 gradually becomes lower, so that the graph is shifted leftward in FIG. 6. If the graph is shifted from "a" to "b" (a two-dot chain line), for example, the resonance frequency is Fo2, and the voltage Vo is made lower from Vo1 to Vo2. Their interrelationship is shown in FIG. 7.

By detecting the DC voltage Vo from the rectifying circuit 16 by the detecting circuit 22, the gas pressure can be known.

In the Second Embodiment, the degree of increasing the changing ratio of the voltage Vo is great in the area in which the resonance frequency is equal to or lower than Fo1 or Fo2 (see FIG. 6) as in the First Embodiment. Thus, the characteristic curve shown in FIG. 3 can be improved by the characteristic curves shown in FIG. 6. Namely, if the gas pressure is high and the amount of the displacement of the diaphragm 56 is great, the linearity of detecting the gas pressure can be improved.

By employing the LC resonance circuit 10, the amount of changing the voltage Vo with respect to the amount of changing the inductance L can be greater, the resolution of detecting the gas pressure can be improved. According to the graph in FIG. 6, the voltage Vo outputted from the rectifying circuit 16 can be equal to or greater than the input voltage Vi, so the structure of the detecting circuit 22 can be simpler, and the sensor has the effects of the First Embodiment.

In the present embodiment, the variable coil 68 and the capacitors 12 and 24 are designed so as to always keep the resonance frequency Fo of the graph, which shows the interrelationship between the frequency F and the voltage Vo, being equal to or higher than the frequency Fi of the continuous signals from the oscillator 14 when the inductance L of the variable coil 68 is changed (see FIGS. 2 and 6). But the variable coil 68 and the capacitors 12 and 24 may be designed so as to always keep the resonance frequency Fo being equal to or lower than the frequency Fi of the continuous signals from the oscillator 14.

(Third Embodiment)

In Third Embodiment, a quake sensor is explained as the displacement sensor.

The quake sensor 28 is employed in heaters, etc. The quake sensor 28 generates a stop signal when a heater is quaked or inclined in the case of, e.g., an earthquake.

Figure 10:
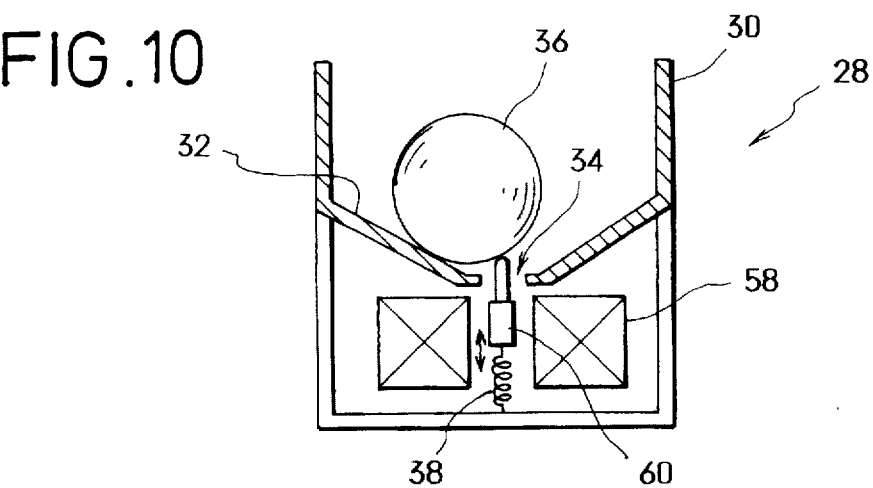
FIG. 10 is a sectional view of a sensing unit of a quake sensor to which the displacement sensor of the present invention is applied.

The structure of the quake sensor 28 will be explained with reference to FIG. 10. Note that, the sensor 28 has the same LC resonance circuit 10, the oscillator 14, the rectifying circuit 16 and the detecting circuit 22 as the First Embodiment. So the elements described in the First Embodiment are assigned the same reference numerals and explanation will be omitted.

The unique point of the quake sensor 28 is a quake ball 36, which is the displacing body. The microcomputer detects if the quake ball 36 is quaked or not or magnitude of the quake. The parameter tables, which are stored in the memory of the detecting circuit 22, include parameters for converting the amount of the displacement of the quake ball 36 into the magnitude of the quake thereof.

A casing 30 is made of a material, which is capable of shielding magnetism.

A holder 32 is formed in the case 30. A central part of the holder 32 is formed into a funnel-shape. There is formed a through-hole 34 in the lowermost part of the holder 32.

The quake ball 36 is freely mounted on an upper face of the holder 32. Diameter of the quake ball 36 is greater than that of the through-hole 34. In the present embodiment, the quake ball 36 acts as the displacing body.

The magnetic coil 58 is provided between an inner bottom face of the casing 30 and the holder 32. An axis of the magnetic coil 58 corresponds to the through-hole 34 of the holder 32. The core 60 is supported by a spring 38, and an upper end section of the core 60 is always projected upward from the through-hole 34. Note that, the spring 38 is designed to shrink by the weight of the quake ball 36, so the spring 38 is always biased downward by the quake ball 36, which is located at an initial position at which the quake ball 36 closes the through-hole 34.

Action of the quake sensor 28 will be explained.

When the casing 30 is quaked, the quake ball 36 is moved upward, from the initial position at which the quake ball 36 closes the through-hole 34, alongside a slope of the holder 32. With the movement of the quake ball 36, the spring 38, which has been shortened, extends and pushes the core 60 upward, so the core 60 is moved in the magnetic coil 58.

With the movement of the core 60, the inductance of the variable coil 68 is changed as well as the First Embodiment, so that the microcomputer is capable of detecting the displacement of the quake ball 36. Thus, the sensor 28 is capable of detecting if the casing 30 is quaked or not.

By employing the LC resonance circuit 10 and the oscillator 14, the amplitude of the continuous signals form the LC resonance circuit 10 and the change of the amplitude can be made greater, so minute quake of the quake ball 36 can be detected. Thus, the quake sensor 28 having high sensitivity can be produced.

(Fourth Embodiment)

In a Fourth Embodiment, a weight sensor is explained as the displacement sensor. Note that, the sensor has the same LC resonance circuit 10, the oscillator 14, the rectifying circuit 16 and the detecting circuit 22 as the First Embodiment. So the elements described in the First Embodiment are assigned the same reference numerals and explanation will be omitted.

A unique point of the Fourth Embodiment is that the core 60 is capable of displacing according to weight of the displacing body. The parameter tables, which have been explained in the First and the Second Embodiments, include parameters for converting the amount of the displacement of the displacing body into the weight. Note that, in the present embodiment, an oil tank 40 of an oil heater acts as the displacing body.

Figure 11:
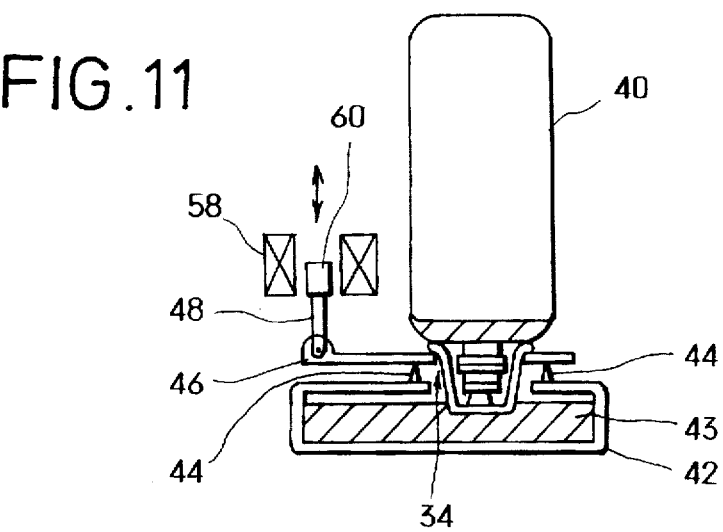
FIG. 11 is a sectional view of a sensing unit of a weight sensor of an oil tank to which the displacement sensor of the present invention is applied.
Figure 12:
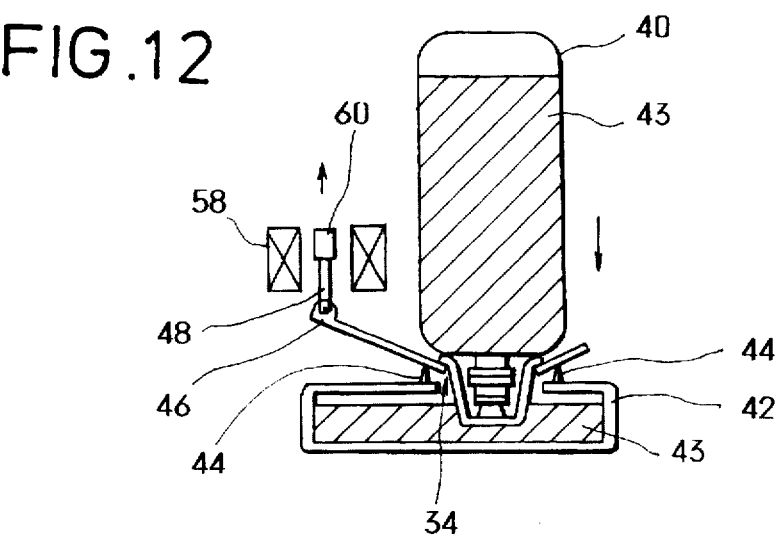
FIG. 12 is a sectional view explaining action of the sensing unit of the weight sensor of the oil tank shown in FIG. 11.
Figure 13:
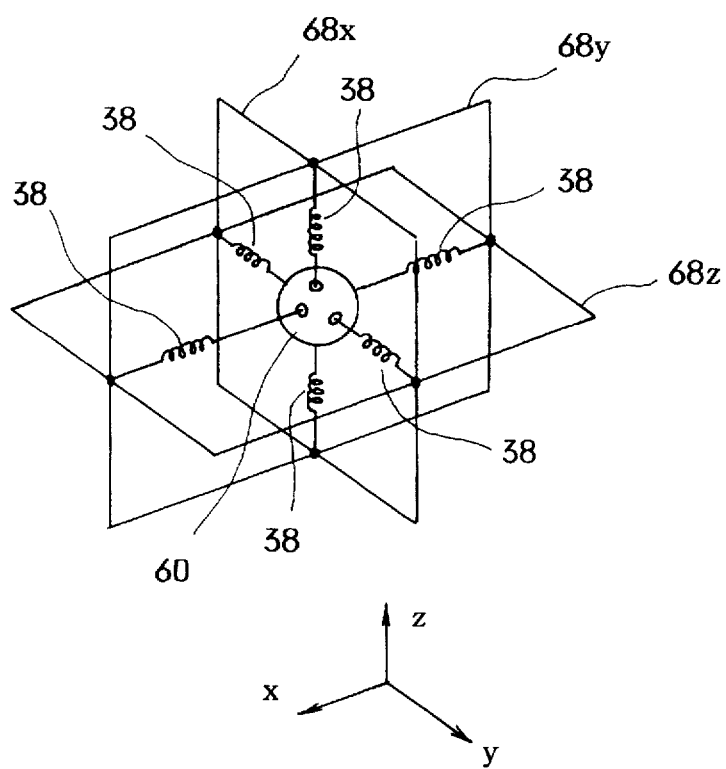
FIG. 13 is a a sectional view of a sensing unit of an acceleration sensor to which the displacement sensor of the present invention is applied.

A basic structure for displacing the core 60 according to the weight of the oil tank 40 will be explained with reference to FIGS. 11 and 12.

A reservoir tank 42 supplies oil 43 into the tank 40.

Fulcrum points 44 are provided to an edge of a mouth section of the reservoir tank 42.

A leaf spring 46 is supported, on an upper side of the reservoir tank 42, by the fulcrum point 44. The leaf spring 46 has a through-hole 34, which is provided above the mouth section of the reservoir tank 42 and corresponds thereto. With this structure, an outlet of the oil tank 40 can be attached into the through-hole 34. When the outlet of the oil tank 40 is attached into the through-hole 34 of the leaf spring 46, the leaf spring 46 is deformed or bent according to the weight of the oil tank 40 as shown in FIG. 12.

An arm 48 is pivotably connected to an end of the leaf spring 46. The arm 48 is moved according to the degree of the deformation of the leaf spring 46, so that the core 60 can be moved close to and away from the magnetic coil 58.

With above described structure, change of the amount of the oil in the oil tank 40 can be converted into the amount of the displacement of the oil tank 40, which is supported by the leaf spring 46. The displacement of the oil tank 40 can be converted into the amount of the displacement of the core 60 by the leaf spring 46 and the arm 48, and further converted into the change of the inductance of the variable coil 68.

The microcomputer of the detecting circuit 22 is capable of detecting the amount of the displacement of the oil tank 40 and the weight of thereof by employing the LC resonance circuit 10, the oscillator 14, the rectifying circuit 16 and the parameter tables in the memory of the detecting circuit 22.

By employing the LC resonance circuit 10 and the oscillator 14, the amplitude of the continuous signals can be changed greater even if the amount of the displacement of the oil tank 40 is quite small, so that the weight sensor is capable of detecting or sensing with high sensitivity and high resolution.

Note that, the weight sensor of the present embodiment is capable of detecting or sensing not only the weight of the oil tank 40 but also weight of many things.

(Fifth Embodiment)

In a Fifth Embodiment, an acceleration sensor is explained as the displacement sensor. Note that, the sensor has the same LC resonance circuit 10, the oscillator 14, the rectifying circuit 16 and the detecting circuit 22 as the foregoing embodiments. So the elements described in the foregoing embodiments are assigned the same reference numerals and explanation will be omitted.

In the Fifth Embodiment, the acceleration sensor has no displacing body for displacing the core. The core is displaced by inertia (the external force), so acceleration of the movement of the core can be calculated by detecting the amount of the displacement of the core.

In the acceleration sensor, three variable coils 68x, 68y and 68z are arranged, in an X-, a Y- and a Z-axis, perpendicular to one another. There is provided a magnetizable body (the core) 60 at a cross point of the three variable coils 68x, 68y and 68z, and the core 60 is movably held by springs 38. Three sets of the LC resonance circuit 10, the rectifying circuit 16 and the detecting circuit 22 are provided to correspond to each of the variable coils 68x, 68y and 68z. The parameter tables, which have been explained in the First and the Second Embodiment, include parameters for converting the amount of the displacement of the core 60 into the acceleration.

When the acceleration works to the acceleration sensor, the core 60 displaces, in the reverse direction with respect to the moving direction of the sensor, according to magnitude of the acceleration. By the displacement of the core 60, the inductance of the variable coil 68x, 68y and 68z are changed, so the microcomputer detects the amount of the displacement of the core 60 in the X-, the Y- and the Z-directions and the acceleration. Further, by detecting elements of the moving direction and the acceleration in the X-, the Y- and the Z-directions, the moving direction and the acceleration of the sensor can be detected.

In the Fifth Embodiment, the sensor is the three dimensional acceleration sensor, but a two dimensional acceleration sensor can be realized by employing two sets of the LC resonance circuit 10, the rectifying circuit 16 and the detecting circuit 22 corresponding to each of the variable coils 68x and 68y.

In the foregoing embodiments, the parameters in the parameter tables of the detecting circuit 22 convert the amount of the displacement of the displacement body or the core into the gas pressure, etc., but the displacement sensor may be used for detecting many kinds of sensors, e.g., a liquid level sensor in which the displacing body is a float, by changing the parameters according to sensing objects.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A displacement sensor comprising:

a displacing body being capable of displacing according to external force;

a core made of magnetizable material connected to said displacing body;

an LC resonance circuit including a magnetic coil and said core being capable of moving close to and away from said magnetic coil according to the displacement of said displacing body;

spring means for supporting said core adjacent to said magnetic coil, said spring means being attached to said displacing body;

a clock unit of a microcomputer inputting continuous signals having a prescribed frequency to said LC resonance circuit;

a rectifying circuit connected to said LC resonance circuit, said rectifying circuit consisting of a diode and capacitor for smoothing the continuous signals from said LC resonance circuit;

a detecting circuit connected to terminals of said capacitor of said rectifying circuit, said detecting circuit including said microcomputer for detecting an amount of displacement of said displacing body on the basis of DC voltage from said rectifying circuit, said detecting circuit including an A/D converter for converting the DC voltage from said rectifying circuit into a digital value; and a memory unit storing first and second data tables, said memory unit being connected to said computer, said memory unit being at least one of part of said computer and external to said computer, said first data table including parameters for converting the digital value into the amount of displacement of the displacing body, said second data table including parameters for converting the amount of displacement into an output measurement value.

2. The displacement sensor according to claim 1, wherein resonance frequency of said LC resonance circuit is designed to change, with the movement of said core, in a range equal to or greater than said prescribed frequency.

3. The displacement sensor according to claim 1, wherein said external force is fluid pressure, and wherein said detecting circuit detects the fluid pressure on the basis of the amount of displacing of said displacing body.

4. The displacement sensor according to claim 3, wherein said displacing body is a diaphragm capable of displacing according to the change of the fluid pressure, and wherein said detecting circuit detects the fluid pressure on the basis of the amount of displacing of said diaphragm.

5. The displacement sensor according to claim 1, wherein said external force is weight of an object member, and wherein said detecting circuit detects the weight on the basis of the amount of displacing of said displacing body.

6. A displacement sensor comprising:

LC resonance circuits including a plurality of magnetic coils, and a core being made of a magnetizable material and capable of moving close to and away from said magnetic coils according to external force, said core is movably held by at least one spring, said plurality of magnetic coils being arranged in a substantially perpendicular manner relative to each other;

an oscillator for inputting continuous signals having a prescribed frequency to said LC resonance circuits;

rectifying circuits connected to said LC resonance circuits, each rectifying circuit consisting of a diode and a capacitor smoothing the continuous signals from said LC resonance circuits; and detecting circuits connected to said rectifying circuits for detecting an amount of displacement of said core on the basis of DC voltage from each rectifying circuit, whereby acceleration of the movement of said core is calculated by each detecting circuit according to said displacement.

* * * * *